United States Patent
Hosomizo (10) Patent No.: US 12,204,801 B2
(45) Date of Patent: Jan. 21, 2025

(54) INFORMATION PROCESSING APPARATUS CONFIGURED TO PERFORM PRINTING USING GENERAL-USE PRINTING PROGRAM, NON-TRANSITORY COMPUTER-READABLE RECORDING MEDIUM, AND PRINTING METHOD THEREFOR

(71) Applicant: BROTHER KOGYO KABUSHIKI KAISHA, Nagoya (JP)

(72) Inventor: Yoshito Hosomizo, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/068,097

(22) Filed: Dec. 19, 2022

(65) Prior Publication Data
US 2023/0124174 A1   Apr. 20, 2023

Related U.S. Application Data

(63) Continuation of application No. 16/750,129, filed on Jan. 23, 2020, now Pat. No. 11,531,502.

(30) Foreign Application Priority Data

Jan. 31, 2019   (JP) .................................. 2019-015953

(51) Int. Cl.
*G06F 3/12* (2006.01)

(52) U.S. Cl.
CPC .......... *G06F 3/1204* (2013.01); *G06F 3/1228* (2013.01); *G06F 3/1254* (2013.01); *G06F 3/126* (2013.01); *G06F 3/1286* (2013.01)

(58) Field of Classification Search
CPC ...... G06F 3/1204; G06F 3/1228; G06F 3/126; G06F 3/1254; H04N 1/00944; H04N 1/00946

See application file for complete search history.

(56) References Cited

U.S. PATENT DOCUMENTS

2007/0229879 A1 * 10/2007 Harmon ................ G06F 3/1207
358/1.15
2010/0220347 A1    9/2010 Deters et al.
(Continued)

FOREIGN PATENT DOCUMENTS

| JP | 2005-258721 A | 9/2005 |
| JP | 2007-172087 A | 7/2007 |

(Continued)

OTHER PUBLICATIONS

Notice of Reasons for Refusal dated Jan. 17, 2023 received in Japanese Patent Application No. JP 2019-015953.

(Continued)

*Primary Examiner* — Nicholas Pachol
(74) *Attorney, Agent, or Firm* — Scully, Scott, Murphy & Presser, P.C.

(57) ABSTRACT

A supporting program stores, in a memory, a parameter list in which identification information of a print queue implemented in an OS and print parameters are associated with each other. In the OS, a plurality of print queues for a single printer can be implemented. When one of the plurality of print queues is selected and a general-use printing program receives a printing instruction to cause the printer to perform printing, the supporting program is activated. When a printing instruction is received while one of the plurality of print queues being selected, the supporting program reads out a print parameter corresponding to the selected print queue and sets the read out print parameter as a print parameter used for printing in accordance with the printing instruction.

9 Claims, 8 Drawing Sheets

(56) References Cited

U.S. PATENT DOCUMENTS

| | | | |
|---|---|---|---|
| 2011/0075207 A1* | 3/2011 | Nakata | G06F 3/1204 |
| | | | 358/1.15 |
| 2011/0222096 A1* | 9/2011 | Natori | G06F 3/1205 |
| | | | 358/1.13 |
| 2011/0255115 A1 | 10/2011 | Tokuda | |
| 2013/0094045 A1* | 4/2013 | Nakata | G06F 3/1285 |
| | | | 358/1.13 |
| 2013/0235422 A1 | 9/2013 | Nakata | |
| 2016/0266851 A1* | 9/2016 | Kanamoto | G06F 3/1228 |
| 2017/0223210 A1 | 8/2017 | Yamada | |
| 2018/0088882 A1* | 3/2018 | Omura | G06F 9/4411 |
| 2018/0275931 A1* | 9/2018 | Saigusa | G06F 3/1253 |
| 2018/0373468 A1* | 12/2018 | Saigusa | G06F 3/1204 |
| 2019/0227755 A1* | 7/2019 | Yamazaki | G06F 3/1254 |
| 2019/0286392 A1* | 9/2019 | Harada | G06F 3/1254 |
| 2019/0339915 A1* | 11/2019 | Saito | G06F 3/1222 |
| 2019/0369930 A1* | 12/2019 | Iida | G06F 3/1288 |
| 2020/0026476 A1* | 1/2020 | Nakajima | G06F 3/1205 |
| 2020/0034087 A1* | 1/2020 | Iida | G06F 3/1228 |
| 2020/0089444 A1* | 3/2020 | Hagiwara | H04N 1/00408 |
| 2020/0097229 A1* | 3/2020 | Nakamura | G06F 3/1286 |
| 2020/0104657 A1* | 4/2020 | Sato | G06K 15/005 |

FOREIGN PATENT DOCUMENTS

| | | |
|---|---|---|
| JP | 2009031878 A | 2/2009 |
| JP | 2011227681 A | 11/2011 |
| JP | 2013089045 A | 5/2013 |
| JP | 2013-182367 A | 9/2013 |
| JP | 2013186824 A | 9/2013 |
| JP | 2017-134718 A | 8/2017 |

OTHER PUBLICATIONS

International Search Report and Written Opinion dated Apr. 14, 2020 received in International Application No. PCT/JP2020/002918.

Office Action dated May 27, 2021 received in U.S. Appl. No. 16/750,129.

Office Action dated Jan. 18, 2022 received in U.S. Appl. No. 16/750,129.

Notice of Allowance dated Apr. 28, 2022 received in U.S. Appl. No. 16/750,129.

Notice of Allowance dated Aug. 22, 2022 received in U.S. Appl. No. 16/750,129.

Notice of Reasons for Refusal dated Feb. 13, 2024 received in Japanese Patent Application No. JP 2023-051199.

* cited by examiner

| PRINT QUEUE | PRINT PARAMETER |
| --- | --- |
| PRINTER A-DRAFT | A4, MONOCHROMATIC, DOUBLE-SIDE |
| PRINTER A-FAIR COPY | A4, COLOR, SINGLE-SIDE |
| PRINTER B | |
| | |

FIG. 3

SELECTION OF PRINTER

PRINTER NAME: USUAL PRINTER ▼

| |
| --- |
| PRINTER A-DRAFT |
| PRINTER A-FAIR COPY |
| PRINTER B |
| USUAL PRINTER |
| |

INFORMATION PROCESSING APPARATUS CONFIGURED TO PERFORM PRINTING USING GENERAL-USE PRINTING PROGRAM, NON-TRANSITORY COMPUTER-READABLE RECORDING MEDIUM, AND PRINTING METHOD THEREFOR

CROSS-REFERENCE TO RELATED APPLICATIONS

This application is a continuation application of U.S. patent application Ser. No. 16/750,129 filed on Jan. 23, 2020 and claims priority under 35 U.S.C. § 119 from Japanese Patent Application No. 2019-015953 filed on Jan. 31, 2019. The entire subject matter of the application is incorporated herein by reference.

BACKGROUND

Technical Field

The technical field disclosed in the present specification relates to a non-transitory computer-readable recording medium containing instructions realizing a supporting program which supports control of a printer, an information processing apparatus and a printing method.

Related Art

There has been widely known a technique to control a printer from an information processing apparatus such as a personal computer, a configuration of installing a printer driver in the information processing apparatus, generating print data using the printer driver and transmitting the print data to the printer. The printer driver is provided by a manufacturer of the printer and is adapted to various functions the printer has, and thus can make full use of the printer.

SUMMARY

Recently, a technique of controlling a printer using a printing program which is standardly implemented in an operating system (OS), without using the above-mentioned printer driver, has been in practical use. According to such a technique, the OS associates a printer with the OS-standard printing program. Thereafter, it becomes possible that, when the OS receives a print instruction corresponding to the printer, printing is executed using the OS-standard printing program, without using the printer driver.

Even in the printing using the OS-standard printing program mentioned above, as with the printing using the printer driver, it is necessary to perform various print settings for each printing. However, it is troublesome for a user to perform many print settings for each printing.

According to aspects of the present disclosure, there is provided a non-transitory computer-readable recording medium for an information processing apparatus, the information processing apparatus having a controller, the information processing apparatus being connected to a printer, the recording medium containing computer-executable instructions realizing a supporting program corresponding to the printer connected to the information processing apparatus. Under control of an operating system of the information processing apparatus, the supporting program, as executed by the controller, causes the information processing apparatus to perform a storing process of storing setting data in which at least one piece of identification information and at least one print parameter are associated with each other, respectively, in a memory of the information processing apparatus, each of at least one piece of identification information identifying a corresponding print queue implemented in the operating system, a plurality of print queues for a single printer being implementable in the operating system. The supporting program as executed by the controller further causes the information processing apparatus to perform, when the controller receives a printing instruction to cause the printer to perform printing using a general-use printing program implemented in the operating system in advance in a state where one of the plurality of print queues is selected, a readout process of obtaining identification information of the selected print queue and reading out the print parameter associated with the obtained identification information from the memory, the obtaining identification information being obtained from one of the operating system and the general-use printing program, and an automatic setting process of setting the print parameter read out in the readout process as a print parameter to be used in the printing based on the printing instruction.

According to aspects of the present disclosure, there is provided an information processing apparatus having a controller. A supporting program corresponding to a printer connected to the information processing apparatus is implemented in the information processing apparatus. An operating system of the information processing apparatus has a general-use printing program which is implemented in the operating system in advance. By using the supporting program under control of the operating system, the controller is configured to perform a storing process of storing setting data in which at least one piece of identification information and at least one print parameter are associated with each other, respectively, in a memory of the information processing apparatus, each of at least one piece of identification information identifying a corresponding print queue implemented in the operating system, a plurality of print queues for a single printer being implementable in the operating system. The controller is further configured to perform, when the controller receives a printing instruction to cause the printer to perform printing using the general-use printing program implemented in the operating system in advance in a state where one of the plurality of print queues is selected, a readout process of obtaining identification information of the selected print queue from one of the operating system and the general-use printing program and reading out the print parameter associated with the obtained identification information from the memory, and an automatic setting process of setting the print parameter read out in the readout process as a print parameter to be used in the printing based on the printing instruction.

According to aspects of the present disclosure, there is provided a method of controlling an information processing apparatus having a controller, a printer being connected to the information processing apparatus, a supporting program corresponding to the printer being implemented in the information processing apparatus, an operating system of the information processing apparatus having a general-use printing program which is implemented in the operating system in advance. The method includes causing the printer to perform printing based on print data generated in the information processing apparatus, and, by using the supporting program under control of the operating system, storing setting data in which at least one piece of identification information and at least one print parameter are associated with each other, respectively, in a memory of the information processing apparatus, each of at least one piece of identification information identifying a corresponding print queue implemented in the operating system, a plurality of print queues for a single printer being implementable in the operating system. The method further includes, when the controller receives a printing instruction to cause the printer to perform printing using the general-use printing program implemented in the operating system in advance in a state where one of the plurality of print queues is selected, obtaining identification information of the selected print queue from one of the operating system and the general-use printing program and reading out the print parameter associated with the obtained identification information, setting the read out print parameter as a print parameter to be used in the printing based on the printing instruction.

DETAILED DESCRIPTION OF THE EMBODIMENT

Hereinafter, referring to the accompanying drawings, a print system using programs according to the embodiment will be described in detail. The present embodiment shows a concrete example of the print system including a personal computer (hereinafter, referred to as a "PC") and a printer.

Figure 1:
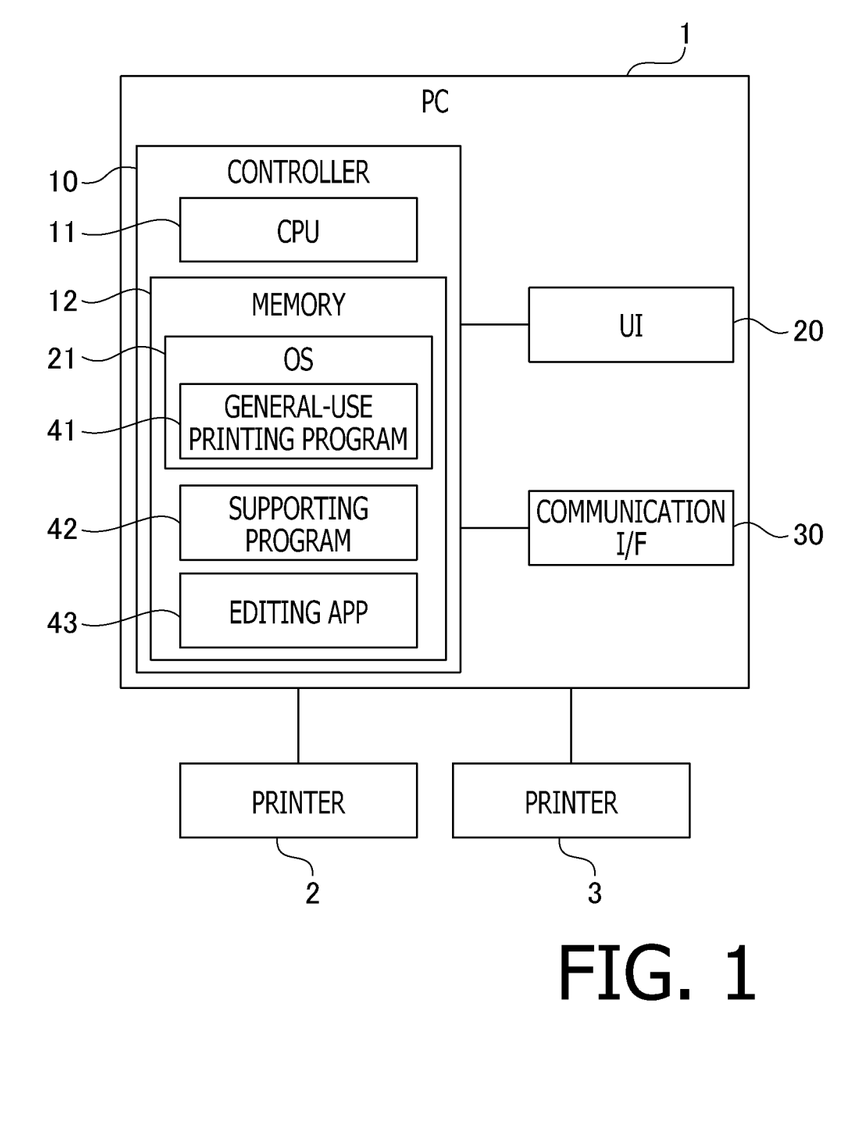
FIG. 1 is a block diagram showing an electrical configuration of a printing system.

An example of a configuration of a print system in which programs according to the embodiment are executed is shown in FIG. 1. The system shown in FIG. 1 includes a PC 1, a printer 2 and a printer 3. The PC 1 is an example of an information processing apparatus. The printer 2 and the printer 3 are devices having a printing function and are configured to communicate with the PC 1 through a local communication or a network communication.

As shown in FIG. 1, the PC 1 includes a controller 10, a user interface (hereinafter, referred to as a "UI") 20 and a communication interface (hereinafter, referred to as a "communication I/F") 30. The UI 20 and the communication I/F 30 are electrically connected to the controller 10.

The UI 20 includes hardware configured to display various pieces of information and receive user's input of instructions. The UI 20 may include a touch panel having both an input receiving function and a displaying function, or a combination of a display having a displaying function and a keyboard and/or a mouse having an input receiving function. The UI 20 is an example of a display device.

The communication I/F 30 includes hardware configured to communicate with the printer 2 and a hardware configured to access the Internet. The communication I/F 30 may include multiple interfaces respectively employing different communication methods. Examples of the communication methods may include the network communication, a USB communication and the like. Further, the communication methods may be wired or wireless.

The controller 10 includes a CPU 11 and a memory 12. The CPU 11 is an example of a computer. The memory 12 includes a ROM, a RAM and a non-volatile memory and stores various application programs (hereinafter, referred to as "APP's") and various pieces of data. According to the present specification, details of the memories could be ignored and any memory having a suitable function could be employed as the memory 12. The CPU 11 executes various processes in accordance with programs retrieved from the memory 12 or in accordance with user's instructions. It is noted that the controller 10 in FIG. 1 is a collective name including hardware and software used to control the PC 1 and does not necessarily represent a single piece of hardware.

An example of the memory 12 may be a computer-readable storage medium. The computer-readable storage medium is a non-transitory medium. Examples of the non-transitory medium are, besides the above-described memory 12, recording mediums such as a CD-ROM, a DVD-ROM and the like. It is noted that the non-transitory medium is also a tangible medium. In contrast, an electric signal carrying a program, which is being downloaded from a server on the Internet, is a signal medium which is a kind of computer-readable media, but not included in the non-transitory computer-readable medium.

The memory 12 stores, as shown in FIG. 1, the OS 21 implemented with a general-use printing program 41, a supporting program 42 and an editing APP 43. The supporting program 42 is an example of a supporting program. The supporting program 42 is, for example, a hardware support APP (abbreviated as HSA) of which specification is published by Microsoft Corporation. The OS 21 is, for example, Microsoft Windows®, MacOS® or Linux®. It is noted that, in the memory 12, in addition to the data/APP shown in FIG. 1, various pieces of data including information regarding connected device, various programs of browser and the like are stored.

The general-use printing program 41 is an APP to cause various printers such as the printer 2 to execute printing from the PC 1 and is an OS-standard printing program which is implemented in the OS 21 in advance. The general-use printing program 41 according to the present embodiment is configured to generate print data the printer can use for printing based on image data subjected to be printed. The general-use printing program 41 is an example of a printing program.

The general-use printing program 41 is a general-purpose APP which can be used for any of a plurality of models of printers supplied by various printer venders. The general-use printing program 41 is configured to cause any of the plurality of models of printers to perform operations which are commonly implemented in the plurality of models of printers. Alternatively, the general-use printing program 41 may be a program supplied from the printer venders to a vender of the OS 21 (e.g., the program may be a kind of printer driver, which is supplied by a printer vender, to be implemented in the OS 21 in advance) so that the general-use printing program 41 is implemented in the OS 21 in advance.

The supporting program 42 is a program which executes processes based on the instruction by the OS 21 in association with the startup of the general-use printing program 41 and an APP which supports controlling of hardware subjected to the instruction. The supporting program 42 is started, for example, by the general-use printing program 41. The supporting program 42 is a program that is prepared by printer venders, such as a vender of the printer 2, for each type of printers. For example, a supporting program 42 for inkjet printers and a supporting program 42 for laser printers are prepared. The supporting program 42 may be prepared not only for each type of printers but also for each model or for each model series of printers.

The vender of the printer registers the supporting program 42 with a platform supplied by the vender of the OS 21 in accordance with a procedure designated by the vender of the OS 21. When a printer 2 is newly connected to the PC 1 and the supporting program 42 corresponding to the printer 2 is registered with the platform, the OS 21 downloads the supporting program 42 from a server in which the supporting program 42 is stored and implements the same in the PC 1.

Then, the OS 21 associates identification information of the implemented supporting program 42 with the printer information of the newly connected printer 2 and stores the same in the memory 12. In the PC 1 to which a plurality of models of printers are connected, a plurality of supporting programs respectively corresponding to a plurality of types of the plurality of models are implemented in the OS 21, and information associating the plurality of printers with the plurality of supporting programs is stored in the memory 12. That is, in the memory 12, as the printer information for each of the printers connected to the PC 1, information on the supporting program 42 corresponding to each printer is stored in addition to the model information and the access information of each printer.

The editing APP is, for example, an APP for generating and/or editing image data and document data. Examples of the editing APP 43 are Microsoft Word® and Power Point®. Further, the editing APP 43 may be an APP provided by the vender of the printer 2 and/or printer 3. The editing APP 43 is configured to receive a user operation including an instruction to cause the printer 2 to perform a particular operation. Specifically, the editing APP 43 is configured to receive, through the UI 20, a print instruction which causes the printer 2 to execute printing.

It is noted that processes and process steps of each flowchart described below basically indicate processes of the CPU 11 in accordance with instructions described in respective programs such as the supporting program 42. That is, in the following description of the processes and steps, terms "determine," "extract," "select," "calculate," "identify," "obtain," "receive," "control" and the like are those performed by the CPU 11. It is noted that the processes by the CPU 11 include controlling of hardware using an API of the OS 21. In the following description, operations of the programs will be described with omitting the detailed description of the OS 21. That is, in the following description, a description "a program B controls hardware C" may be interpreted to "a program B uses the API of the OS 21 to control the hardware C." Further, a process of the CPU 11 in accordance with the instruction described in a program may be described in a simplified manner. For example, the name of the program is omitted and simply described such that "the CPU 11 performs." Further, a process of the CPU 11 in accordance with an instruction described in the program may be described in a simplified manner such that "the program A performs" with omitting the term "CPU."

It is noted that the term "obtain" is used to mean that a request is not necessarily be made. That is, a process of the CPU 11 to receive data without any request is included within a concept that "the CPU 11 obtains data." Further, the term "data" in the present specification is used to mean a bit array readable by a computer. Multiple pieces of data having different formats but substantially the same contents will be treated as the same data. So is the information in the present specification. It is noted that terms "request" and "instruct" represent concepts of outputting information indicating something is requested and information indicating something is instructed, respectively. It is also noted that information representing something is requested or something is instructed may be simply referred to by terms "request" or "instruct."

Further, a process of the CPU 11 to determine whether or not information A indicates an event B may be described conceptually such that "the CPU 11 determines whether event B or not based on information A." Furthermore, a process of the CPU 11 to determine whether information indicates event B or event C may be described conceptually such that "the CPU 11 determines whether event B or event C based on information A."

Next, a configuration of the supporting program 42 and a printing procedure including processes based on the supporting programs 42 of the present embodiment will be generally described with reference to a sequential chart shown in FIG. 2. The supporting program 42 is a program that the general-use printing program 41 instructs to execute when a print instruction to execute printing using the general-use printing program 41 is received through the editing APP 43 or the like in a state where a printer corresponding to the supporting program 42 is designated. In the following description, a case where the PC 1 receives, through the UI 20 (e.g., with the editing APP 43), an instruction to execute printing with the printer 2 through the general-use printing program 41 in a state where image data subjected to be printed is designated and the supporting program 42 corresponding to a type of a model of the printer 2 is implemented in the PC 1 will be described.

Firstly, the editing APP 43 receives, through the UI 20, designation of an image subjected to be printed and an input of an instruction to execute printing (arrow A). An image that the editing APP 43 displays is an example of an image subjected to be printed. The editing APP 43 displays, for example, documents edited with the editing APP 43 or pictures and the like read with the editing APP 43 as the image. Then, the editing APP 43 which received the print instruction delivers a print execution notification indicating contents of received print instruction to the OS 21. It is noted that, in FIG. 2, operations of the OS 21 are omitted.

When the print execution notification indicating usage of the general-use printing program 41 is received, the OS 21 activates the general-use printing program 41 and delivers the print execution notification to the general-use printing program 41 (arrow B). The general-use printing program 41 can obtain, from the print execution notification, various pieces of information included in the print instruction such as information indicating a printer to be caused to execute printing, print queue information for identifying a print queue, information indicating print parameters set with the APP, information indicating image data subjected to be printed, and information for identifying a user who instructed to execute printing. It is noted that, as will be described later, these pieces of information are used in the supporting program 42 as well.

The general-use printing program 41 identifies, based on the information included in the print execution notification, a printer designated as a device to be caused to execute printing. For example, when the printer 2 is designated as the device to be caused to execute printing, the general-use printing program 41 identifies the model of the printer 2 based on the model information of the printer included in the printer information stored in the memory 12. Then, since the supporting program 42 corresponding to the printer 2 designated by the print instruction is stored in the memory 12, the general-use printing program 41 outputs an execution command for causing the supporting program 42 to execute processes to activate the supporting program 42. That is, in response to the detection of the print execution notification by the general-use printing program 41, the execution command is output from the general-use printing program 41 to the supporting program 42.

The supporting program 42 executes various processes in accordance with the execution instruction output from the general-use printing program 41. The processes by the supporting program 42 include, for example, a print parameter editing process for editing print parameters included in the print instruction. The general-use printing program 41 of the present embodiment outputs, before starting generation of an intermediate image data, an execution command for causing the supporting program 42 to execute the print parameter editing process (arrow C).

Figure 7:
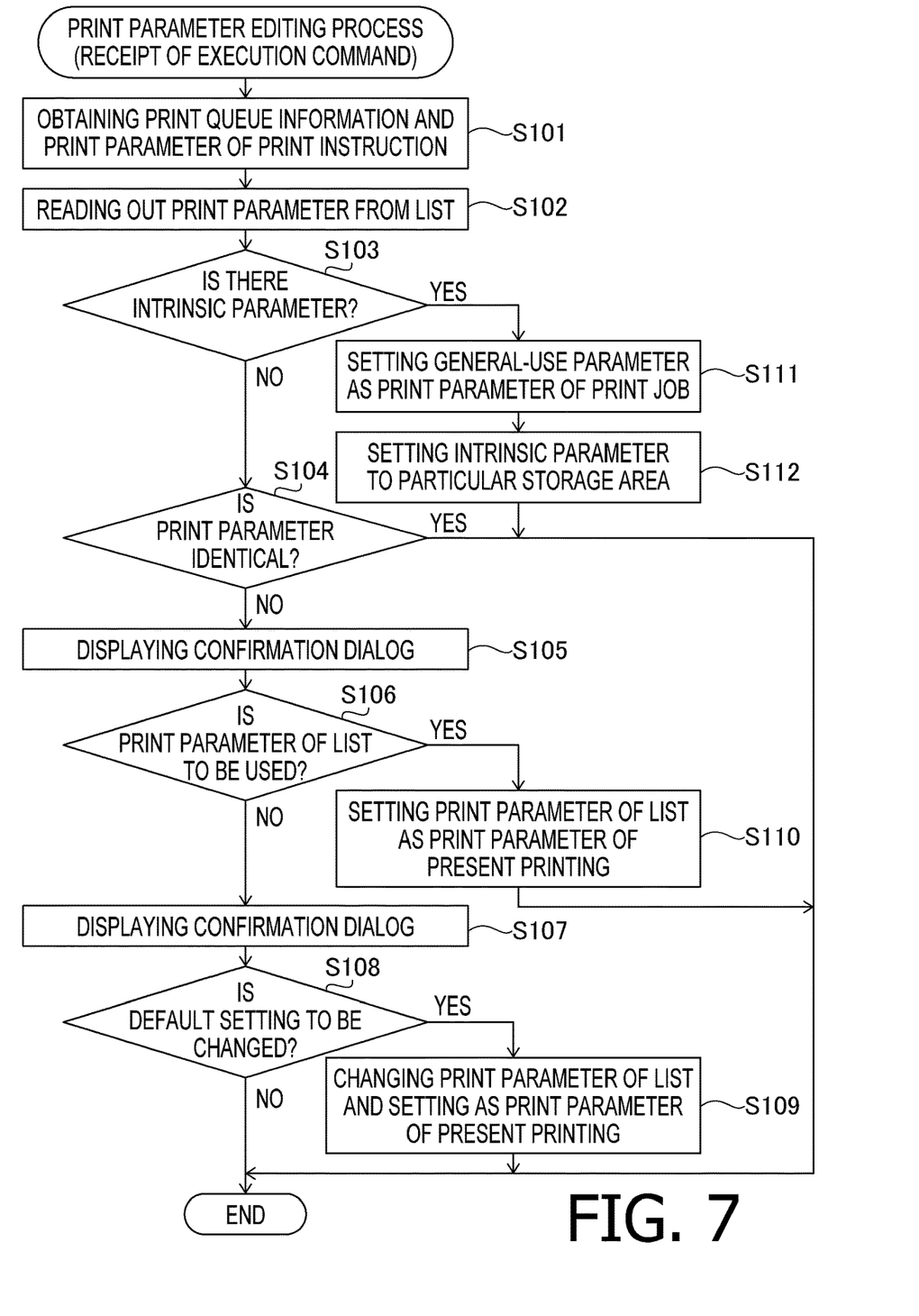
FIG. 7 is a flowchart illustrating a print parameter editing process.

The supporting program 42 that has received the execution command from the general-use printing program 41 starts the print parameter editing process (arrow D and FIG. 7). The print parameter editing process is a process that is executed before the general-use printing program 41 starts generating the intermediate image data. The supporting program 42 can obtain print parameters and various pieces of information included in the print instruction from the general-use printing program 41 by the execution command of the print parameter editing process. It is noted that, among the pieces of information to be obtained, the print parameters are obtained in a state where it is allowed to write data into the print parameters. Therefore, the supporting program 42 can edit the print parameters in the print parameter editing process.

In the present embodiment, the execution command output at the arrow C includes the print parameters and the print queue information. The supporting program 42 of the present embodiment edits the print parameters included in the execution command in accordance with the print queue information included in the execution command in the print parameter editing process. Details of the print parameter editing process will be described later.

It is noted that, as the print parameters, there are general-use parameters that are used in the generation of print data by the general-use printing program 41 and intrinsic parameters that are not used in the generation of print data by the general-use printing program 41. The supporting program 42 can edit both the general-use parameters and the intrinsic parameters in the print parameter editing process. It is noted that a commonly used editing APP 43 accepts an editing instruction of the general-use parameters but often do not accept an editing instruction of the intrinsic parameter.

The general-use parameters are parameters that can be mutually exchanged between the general-use printing program 41 and the supporting program 42. The general-use parameters are, for example, parameters for setting a sheet size, a printing resolution and color/monochromatic printing. The supporting program 42 edits the general-use parameters among the print parameters of a print job. The supporting program 42 may edit the print parameters by overwriting on the print parameters of the print job, or may edit the print parameters through the general-use printing program 41 by providing the print parameters to the general-use printing program 41.

On the other hand, the intrinsic parameters are parameters that cannot be mutually exchanged between the general-use printing program 41 and the supporting program 42. The intrinsic parameters are, for example, parameters for setting sheet tray designation, both-side/single-side printing, aggregation printing and addition of watermarks. The supporting program 42 stores the intrinsic parameters in a storage area for the supporting program 42 in the memory 12 and edits and reads out the intrinsic parameters without using the general-use printing program 41. The storage area for the supporting program 42 may be, for example, a registry prepared by the OS 21. It is noted that, if the general-use printing program 41 can deal with the intrinsic parameters as well, the supporting program 42 may edit and read out the intrinsic parameters through the general-use printing program 41.

When the editing of the print parameters is finished, the supporting program 42 returns an end notification indicating the end of the print parameter editing process to the general-use printing program 41 and terminates the process (arrow E).

In response to receiving the end notification indicating the end of the print parameter editing process from the supporting program 42, the general-use printing program 41 generates the intermediate image data by converting a format of the image data included in the print execution notification to a format of the intermediate image data and generates a print job including the intermediate image data (arrow F). There are various types of image data as the image data included in the editing APP 43, and the general-use printing program 41 converts received image data to an intermediate image data suitable for the generation of the print data. This intermediate image data is data to which the general-use parameter after the edition in the print parameter editing process is reflected. It is noted that, if the image data included in the print execution notification is suitable for the generation of the print data, the generation of the intermediate image data may be omitted and the image data may be directly used as the intermediate image data. The intermediate image data is, for example, XPS format data.

The general-use printing program 41 generates the print data based on the generated intermediate image data (arrow G). The print data generated by the general-use printing program 41 is print data of a format that can be used in printing with various types of printers. The print data is, for example, PWG Raster format data or PDF format data. It is noted that, if the general-use printing program 41 can generate the print data from the image data included in the print execution notification without through the intermediate image data, the process for generating the intermediate image data at the arrow F may be omitted.

If the intrinsic parameters are set in the print parameter editing process, the supporting program 42 edits the intermediate image data or the print data. For example, the supporting program 42 edits the intermediate image data in accordance with the intrinsic parameters before the print data is generated based on the intermediate image data generated by the general-use printing program 41. Alternatively, the supporting program 42 edits the print data in accordance with the intrinsic parameters before the print data generated by the general-use printing program 41 is transmitted to the printer 2.

For example, the supporting program 42 adds to the print data a command for causing the printer 2 to execute a function unique to the printer 2. The function unique to the printer 2 includes, for example, a toner saving setting and a finisher setting. If the printer 2 has functions of adding watermarks, header/footer and the like to an image by itself, the supporting program 42 may add commands for causing the printer 2 to execute these functions to the print data.

The general-use printing program 41 transmits a print command to the printer 2 while attaching thereto the generated print data or the print data edited by the supporting program 42 (arrow H). Then, the printer 2 which received the print command executes printing of the image of the print data in accordance with the print data attached to the print command. When the printer 2 receives print data to which a command attached, the printer 2 performs operations indicated by the command when executing printing. It is noted that, if the print data is edited by the supporting program 42, after finishing the process of editing print data, the supporting program 42 may transmit the print command to the printer 2 through the communication I/F 30 without using the general-use printing program 41.

In the printing system of the present embodiment, the general-use printing program 41 allows to generate a plurality of print queues for one printer. For example, if connection of a new printer to the printing system is detected, the general-use printing program 41 accepts a plurality of print queue generation instructions for one printer. Alternatively, if an instruction for generating a copy of a registered print queue (i.e., a copy instruction) is received, the general-use printing program 41 generates a new print queue for the same printer. Then, the general-use printing program 41 stores the generated print queue in the memory 12 while associating the print queue with the identification information of the supporting program 42 corresponding to the printer. The general-use printing program 41 causes the supporting program 42 associated to the print queue to execute processes regardless of which print queue is selected at the time the print instruction is received. It is noted that the print queue generation process may be a process executed by the OS 21.

Figure 3:
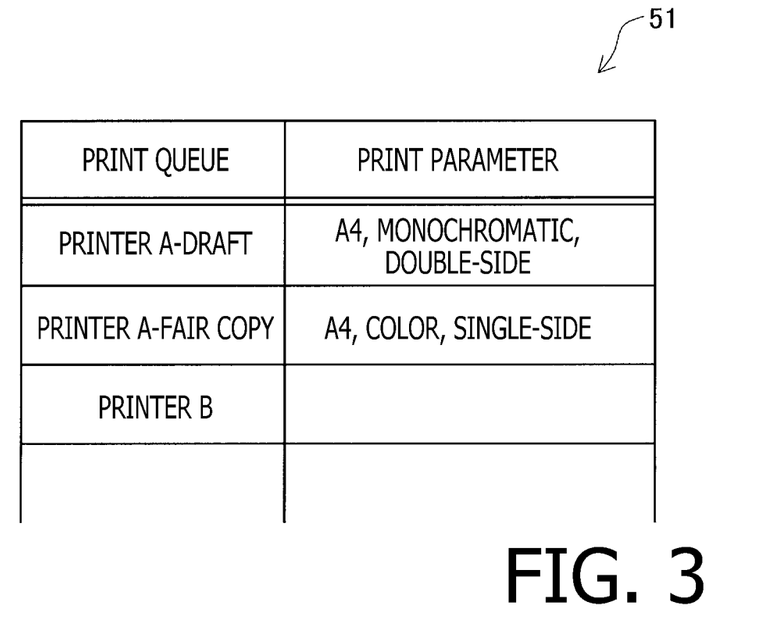
FIG. 3 illustrates an example of parameter data.

The supporting program 42 of the present embodiment includes a parameter list 51 for storing every pieces of print queue information of all the corresponding printers by itself. For example, as shown in FIG. 3, in the parameter list 51, information for identifying each generated print queue and information indicating the print parameters being set in the print queue are associated to each other and stored as one record. The record stored in the parameter list 51 is an example of setting data. The parameter list 51 is stored in a storage area for the supporting program 42 in the memory 12. The storage area for the supporting program 42 may be, for example, a registry prepared by the OS 21.

For example, the parameter list 51 includes as many records as the print queues, each record being stored while associating a name of a print queue designated by the user with the print parameters set to the print queue. The name of the print queue is an example of a print queue identification information. The print parameters are, for example, parameters for setting a sheet size, color/monochromatic printing, both-side/single-side printing and a printing resolution, and may include both the above-described general-use parameters and the intrinsic parameters. The intrinsic parameter is an example of an intrinsic print parameter.

For example, when a user wants to make use of the printing system of the present embodiment by printing drafts in the monochromatic both-side printing and printing a fair copies in the color single-side printing, the user can set two types of print queues for the same printer A as shown in FIG. 3. In the example shown in FIG. 3, to the print queue named "printer A-draft", as a print job for causing a printer named printer A to execute printing, the print parameters for the sheet size of A4 and the monochromatic double-side printing are set. Further, to the print queue named "printer A-fair copy", as a print job for causing the same printer A to execute printing, the print parameters for the sheet size of A4 and the color single-side printing are set.

Figure 4:
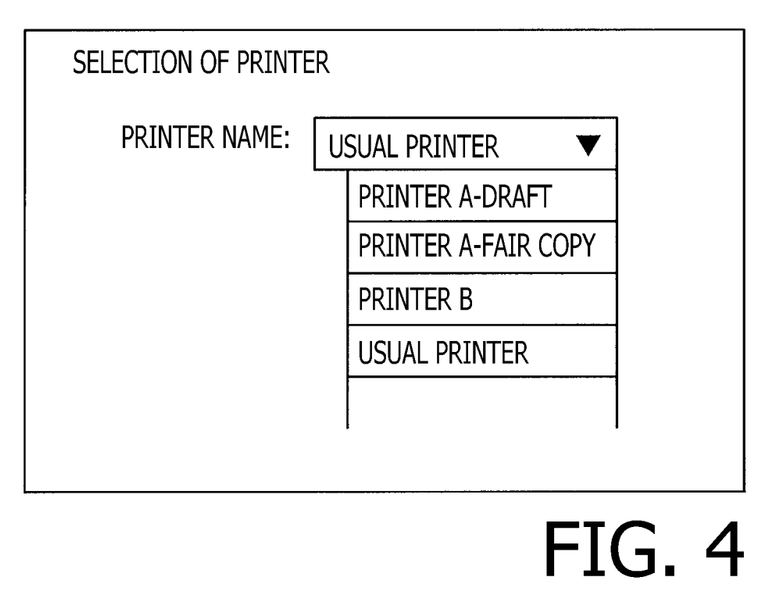
FIG. 4 shows an example of a screen for printer selection.

In the editing APP 43 or the like performing a print instruction to print using the general-use printing program 41, when the editing APP 43 or the like receives an instruction to select a printer, for example, the general-use printing program 41 causes the UI 20 to displays the names of the print queues as options of printer names as shown in FIG. 4. When one of the print queues is selected and a print instruction is received from the user through the general-use printing program 41, the general-use printing program 41 causes the supporting program 42 corresponding to a printer of the selected print queue to execute processes. The supporting program 42 reads out the print parameters stored in association with the selected print queue from the parameter list 51 and sets them as print parameters for the print instruction.

For example, the user can instruct printing by selecting, from among the options shown in FIG. 4, the print queue named "printer A-draft" when checking drafts or selecting the print queue named "printer A-fair copy" when printing fair copies. Thus, it is possible to cause, only by selecting the print queue, the same printer A to execute various printing operations based on the print parameters according to uses, respectively.

Figure 5:
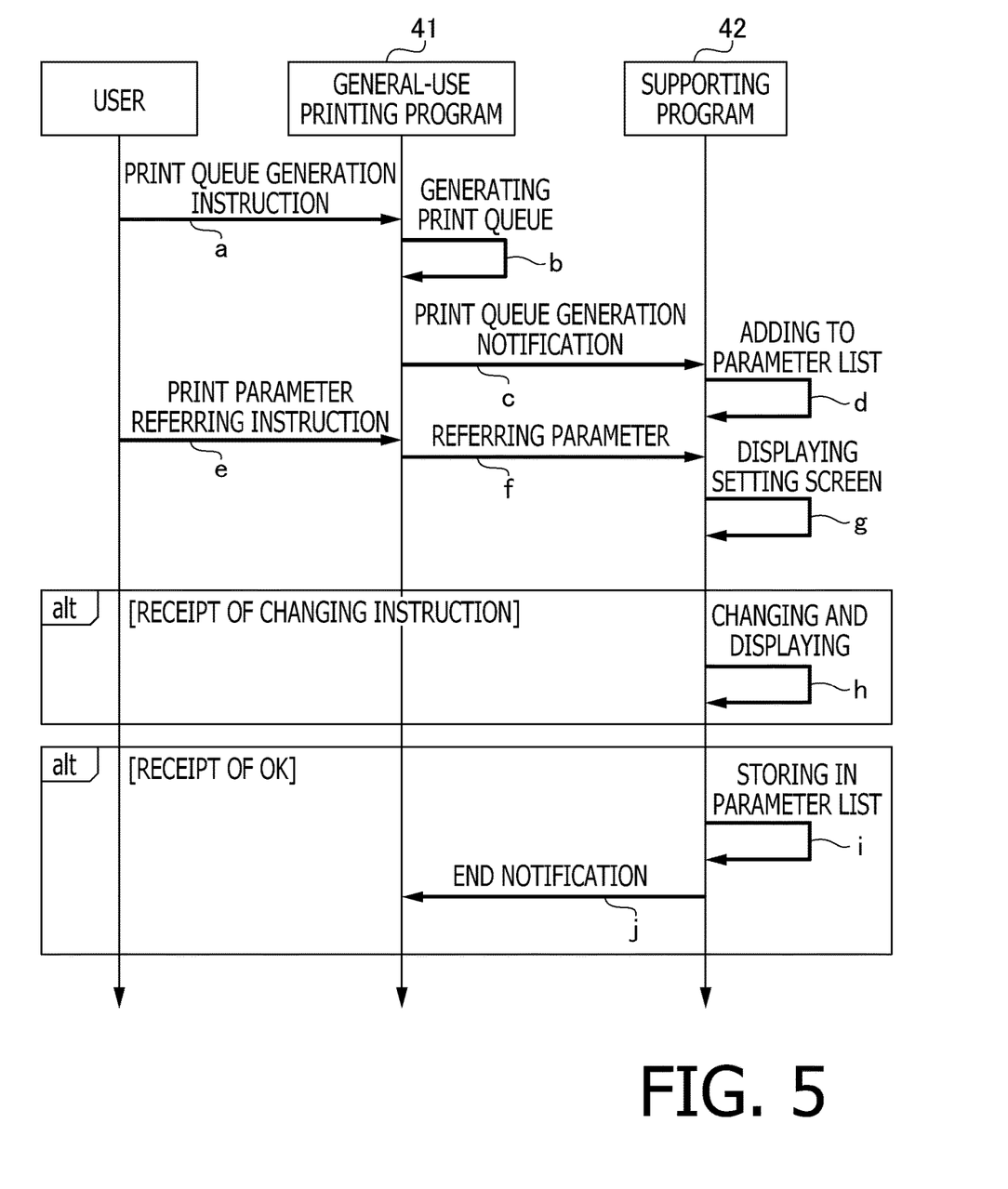
FIG. 5 is a sequential chart illustrating an example of operations for adding and changing a print queue.

Next, an exemplary procedure for registering the print queue to the general-use printing program 41 will be described with reference to a sequential chart shown in FIG. 5. The general-use printing program 41 receives an instruction to generate a print queue from the user (arrow a). As described above, the general-use printing program 41 accepts, as the print queue generation instruction, a plurality of print queue generation instructions for the new printer and a copy instruction of the print queue. The general-use printing program 41 receives a name of a print queue to be generated and information indicating a printer, associates the information indicating a printer with the identification information of the supporting program 42, and generates a print queue (arrow b). In the generation of the print queue, the general-use printing program 41 for example sets general print parameters to the generated print queue.

After the generation of the print queue, the general-use printing program 41 activates a print parameter setting program being a part of the supporting program 42 and delivers the newly generated print queue information to the supporting program 42 (arrow c). The print parameter setting program is a program that is executed after receiving the print queue generation instruction and generating the print queue, or when a print parameter change instruction for changing print parameters of a print queue is received. It is noted that the print parameter setting program of the supporting program 42 may be executed upon receiving an execution instruction from the user directly.

The supporting program 42 receives the generated print queue information such as the name of the print queue and the information indicating a printer from the general-use printing program 41 and adds a record of the generated print queue to the parameter list 51 (arrow d). At this time, the supporting program 42 may store the general print parameters set by the general-use printing program 41 in the parameter list 51. Further, the supporting program 42 may itself include initial values for the print parameters and may store the initial values in the parameter list 51. Further, the supporting program 42 may generate a record void of the print parameters.

Further, the supporting program 42 receives the print parameter change instruction for each print queue stored in the parameter list 51. For example, when an instruction to refer to print parameters of a designated print queue is received through various APPs or the general-use printing program 41 (arrow e), the general-use printing program 41 activates the print parameter setting program of the supporting program 42 and delivers an instruction to refer to the print parameters to the supporting program 42 (arrow f).

In response to the instruction to refer to the print parameters, the supporting program 42 causes the UI 20 to display a setting screen for setting the print parameters (arrow g). The process at the arrow g is an example of a displaying process. It is noted that it is preferable that the supporting program 42 proceeds to the arrow g to cause the UI 20 to display the setting screen when a record is added to the parameter list 51 at the arrow d.

Figure 6:
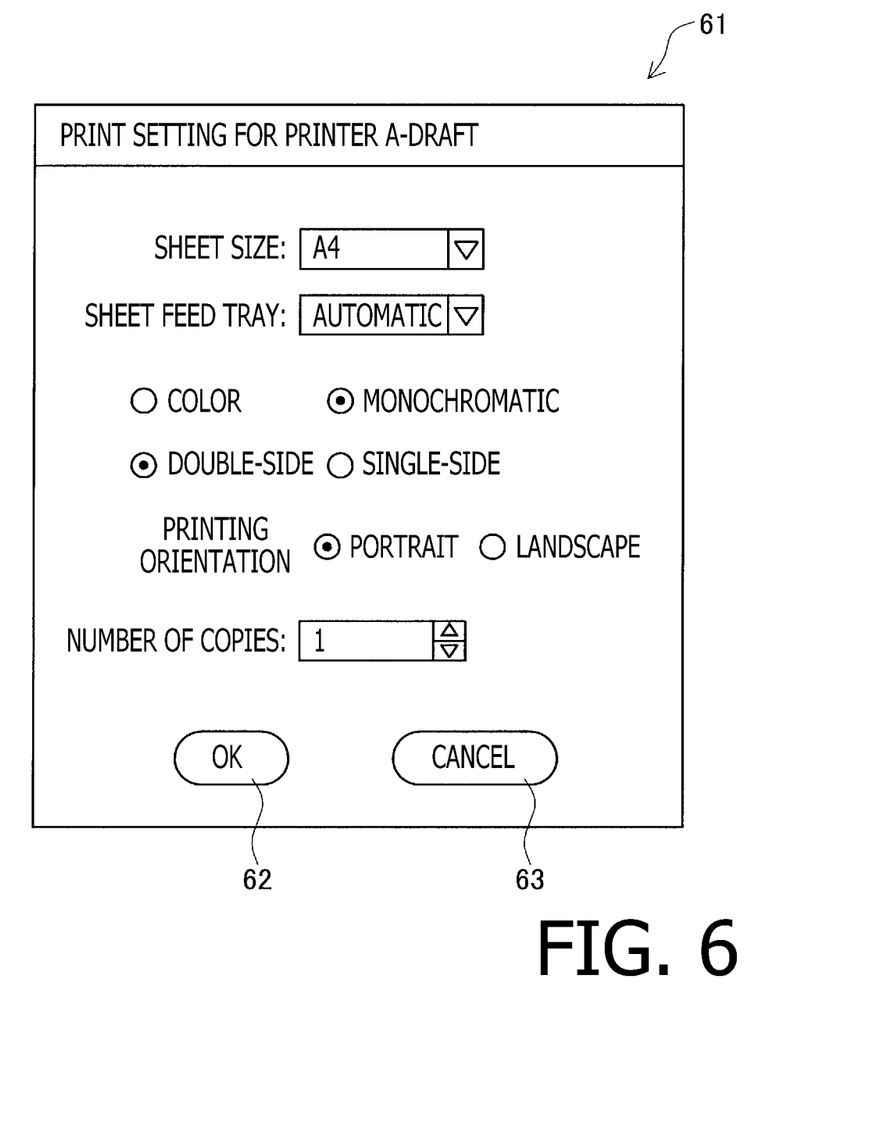
FIG. 6 shows an example of a setting screen.

An example of the setting screen is shown in FIG. 6. In the setting screen 61 shown in FIG. 6, selection boxes for the sheet size, the sheet feed tray and the like are displayed in a state where the print parameters stored in the parameter list 51 are selected. Further, in the setting screen 61, buttons such as an OK button 62 and a Cancel button 63 are displayed as well. The initial values of the print parameters may be displayed when the parameter list 51 is void of the print parameters.

The supporting program 42 receives the print parameter change instruction by the user in the displayed setting screen 61. When the print parameter change instruction by the user is received, the supporting program 42 changes the setting screen 61 based on the received print parameter change instruction and causes the UI 20 display the changed setting screen 61 (arrow h).

When an operation of the OK button 62 is received, the supporting program 42 stores the contents displayed at the time of the reception in the parameter list 51 as the print parameters of the referring print queue (arrow i). The process of the arrow i is an example of a storing process. Further, the supporting program 42 delivers an end notification to the general-use printing program 41 (arrow j) and terminates the process. When an operation of the Cancel button 63 is received, the supporting program 42 delivers the end notification to the general-use printing program 41 and terminates the process without executing the storing of the print parameters in the parameter list 51.

It is noted that the general-use printing program 41 may receive information of the print parameters set in the supporting program 42 from the supporting program 42 and store the information in an area the general-use printing program 41 itself uses. The process by the general-use printing program 41 in this case is an example of the storing process as well. By configuring in this way, the general-use printing program 41 can cause the UI 20 to display information identical to the print parameters stored in the parameter list 51 of the supporting program 42 in a case where information of the print parameters of the print queue is requested while executing various APPs.

Next, a procedure of the print parameter editing process for realizing the operation for editing the print parameters when executing printing with the printing system of the present embodiment will be described with reference to a flow chart shown in FIG. 7. This print parameter editing process is executed in the CPU 11 of the PC 1 in accordance with the supporting program 42 upon receiving the execution command from the general-use printing program 41 based on the print instruction.

It is noted that, as described above, if there is a print instruction for causing the general-use printing program 41 to perform printing of an image in a state where one of the generated print queues is selected, the general-use printing program 41 causes the supporting program 42 associated to the printer corresponding to the selected print queue to execute processes. The print parameter editing process is a process that is executed before the general-use printing program 41 generates the print data.

In the print parameter editing process, the CPU 11 obtains print queue information indicating a print queue in which a device to be caused to execute printing is designated by the print instruction and information indicating print parameters attached to the print instruction from the general-use printing program 41 (S101). The print parameters attached to the print instruction are print parameters set in the APP or the like which received the print instruction and only include general-use parameters.

Further, the CPU 11 reads out, from the parameter list 51, print parameters stored in association with the obtained print queue (S102). S102 is an example of a readout process. The print parameters read out from the parameter list 51 may include both the general-use parameters and the intrinsic parameters or may include only one of the general-use parameters and the intrinsic parameters. As described above, the general-use parameters are mutually exchanged between the general-use printing program 41 and the supporting program 42 but the intrinsic parameters are not mutually exchanged and are dealt in the storage area for the supporting program 42.

The CPU 11 determines whether the print parameters read out from the parameter list 51 include the intrinsic parameters (S103). If it is determined that the intrinsic parameters are not included (S103: NO), the CPU 11 determines whether the print parameters obtained in S101 and the print parameters read out in S102 are identical (S104). If it is determined that they are not identical (S104: NO), the CPU 11 causes the UI 20 to display a confirmation dialog inquiring which print parameters to use in the present printing (S105).

The CPU 11 determines whether a selection to use the print parameters read out from the parameter list 51 in the present printing is received through the UI 20 in the displayed confirmation dialog (S106). S106 is an example of a selection process. If it is determined that a selection to use not the print parameters read out from the parameter list 51 but the print parameters set in the print instruction is received (S106: NO), the CPU 11 causes the UI 20 to display a confirmation dialog inquiring whether to set the print parameters set in the print instruction as default print parameters for this print queue (S107).

Then, the CPU 11 determines whether a selection to set the print parameters set in the print instruction as the default print parameters for the print queue is received through the UI 20 in the displayed confirmation dialog (S108). If it is determined that the selection to set the print parameters set in the APP as the default print parameter for the print queue is received (S108: YES), the CPU 11 changes the print parameters in the parameter list 51 to the print parameters attached to the print instruction and set the print parameters attached to the print instruction as the print parameters for the present printing (S109). The change in S109 is an example of a changing process.

If it is determined that a selection to use not the print parameters attached to the print instruction but the print parameters read out from the parameter list 51 is received (S106: YES), the CPU 11 sets the print parameters read out from the parameter list 51 as the print parameters for the present printing (S110). S110 is an example of an automatic setting process. Thus, the print parameters set in the parameter list 51 are used regardless of the print parameters set in the APP.

On the other hand, if it is determined that the print parameters read out from the parameter list 51 include the intrinsic parameters (S103: YES), the CPU 11 determines to use the print parameters read out from the parameter list 51. Then, the CPU 11 sets the general-use parameters among the print parameters read out from the parameter list 51 as the print parameters of a print job (S111). The general-use parameters are shared with the general-use printing program 41. Further, the CPU 11 stores, among the print parameters read out from the parameter list 51, the intrinsic parameters in the storage area for the supporting program 42 and sets the intrinsic parameters (S112). S111 and S112 are examples of the automatic setting process.

Further, if it is determined in S104 that the print parameters in the print instruction and the print parameters in the parameter list 51 are identical (S104: YES) or if it is determined not to change the default print parameter of the print queue (S108: NO) or after S109, S110 or S112, the CPU 11 notifies the general-use printing program 41 that the print parameter editing process is terminated (the arrow E in FIG. 2) and terminates the print parameter editing process.

Figure 2:
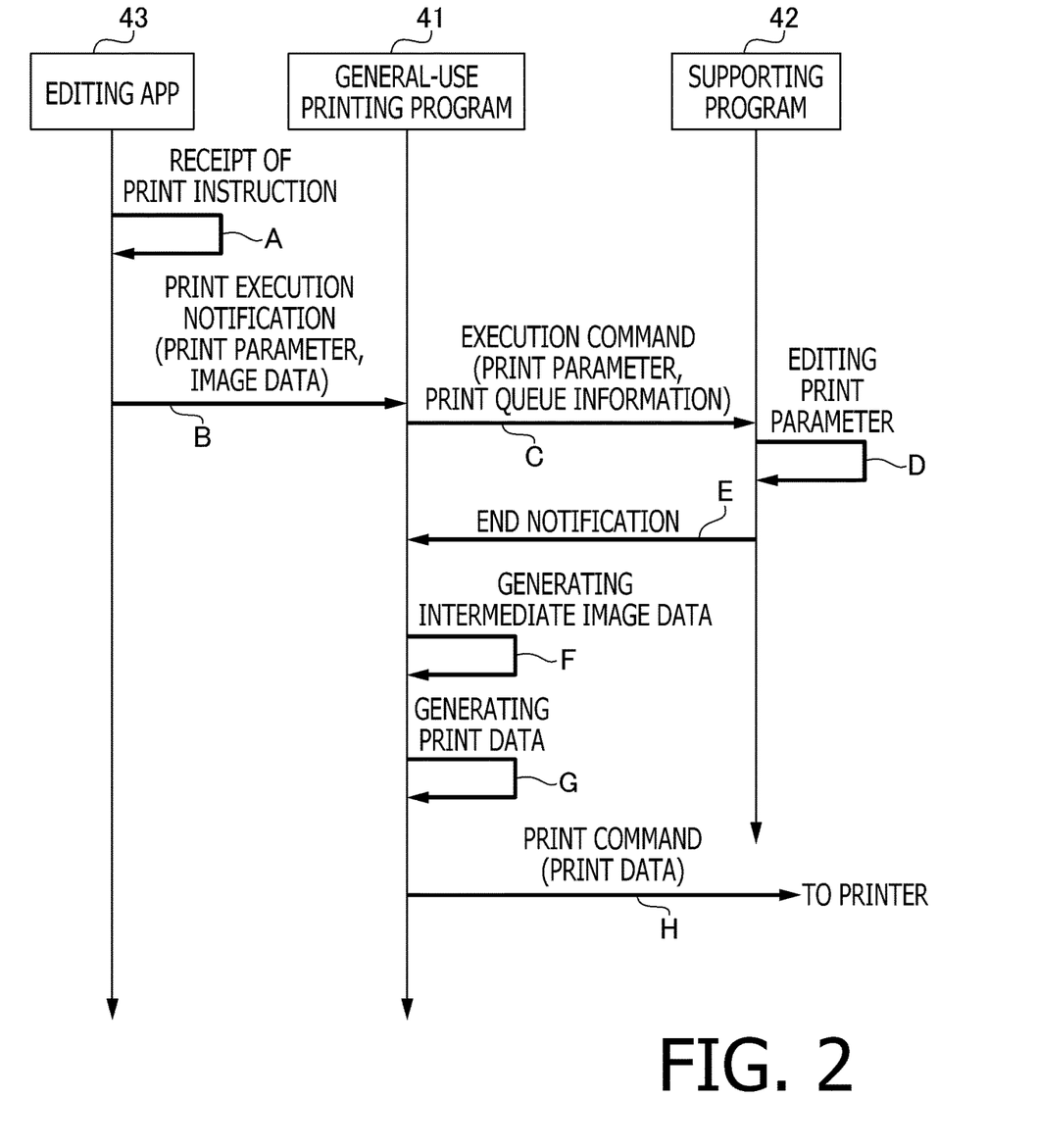
FIG. 2 is a sequential chart illustrating an example of an order of operations realized by respective programs.

Thereafter, the PC 1 executes each process in accordance with the general-use printing program 41 and the supporting program 42 as shown in the above-described sequential chart shown in FIG. 2. It is noted that, even in the case where the print parameters read out from the parameter list 51 includes the intrinsic parameters, the processes S104-S110 may be executed by comparing only the general-use parameters in the print parameters read out from the parameter list 51 with the print parameters in the print instruction.

For example, the supporting program 42 edits the intermediate image data based on the execution command from the general-use printing program 41. A procedure of the intermediate image data editing process for realizing the operation for editing the intermediate image data will be described with reference to a flow chart shown in FIG. 8. This intermediate image data editing process is executed in the CPU 11 of the PC 1 in accordance with the supporting program 42 upon receiving the execution command from the general-use printing program 41. The intermediate image data editing process is a process that is executed before the general-use printing program 41 generates the print data.

Figure 8:
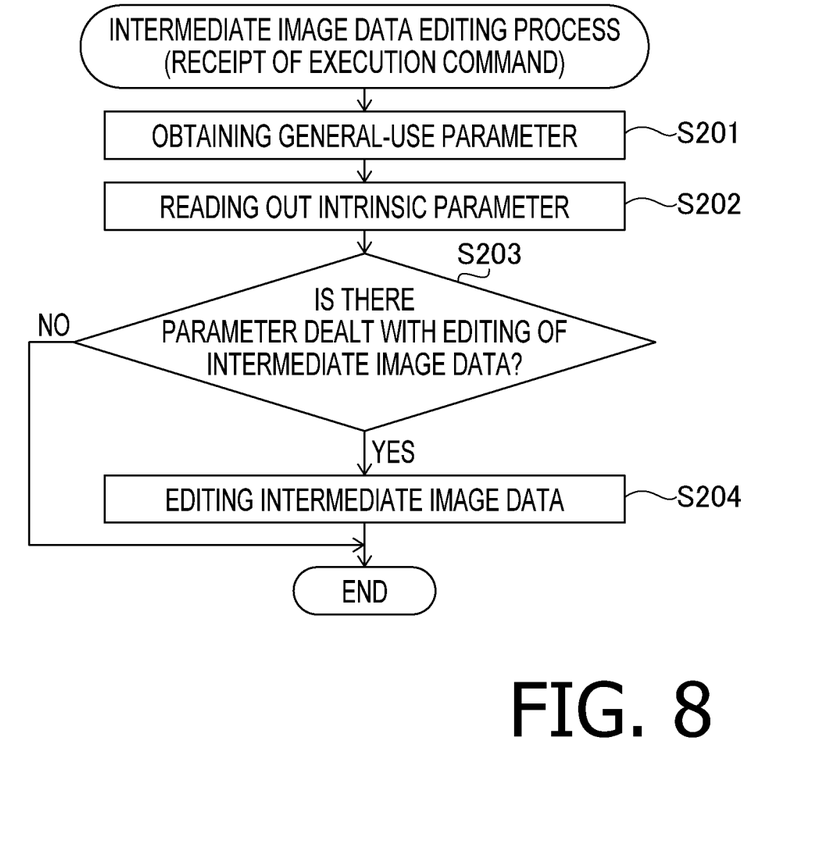
FIG. 8 is a flowchart illustrating a procedure of an intermediate image data editing process.

In the intermediate image data editing process, the CPU 11 obtains the print parameters. Specifically, the CPU 11 obtains the general-use parameters from the area sharing with the general-use printing program 41 (S201). Further, the CPU 11 reads out the intrinsic parameters from the storage area for the supporting program 42 (S202). The print parameters obtained in S201 and S202 are print parameters edited in the print parameter editing process. Then, the CPU 11 determines whether the print parameters obtained in S201 and S202 include parameters that can be dealt by editing the intermediate image data or not (S203).

If it is determined that the print parameters obtained in S201 and S202 include parameters that can be dealt by editing the intermediate image data (S203: YES), the CPU 11 processes the intermediate image data (S204). After S204, or if it is determined that the print parameters obtained in S201 and S202 do not include parameters that can be dealt by editing the intermediate image data (S203: NO), the CPU 11 notifies the general-use printing program 41 that the intermediate image data editing process is terminated and terminates the intermediate image data editing process.

It is noted that, if the print parameters obtained in S201 and S202 include print parameters that can be dealt by editing the print data, similarly to the intermediate image data editing process, the supporting program 42 edits the print data in the print data editing process. In this case, the supporting program 42 executes the print data editing process based on the execution command from the general-use printing program 41. A procedure of the print data editing process will be described with reference to a flow chart shown in FIG. 9. This print data editing process is executed in the CPU 11 of the PC 1 in accordance with the supporting program 42 upon receiving the execution command from the general-use printing program 41. The print data editing process is a process that is executed after the general-use printing program 41 generated the print data.

Figure 9:
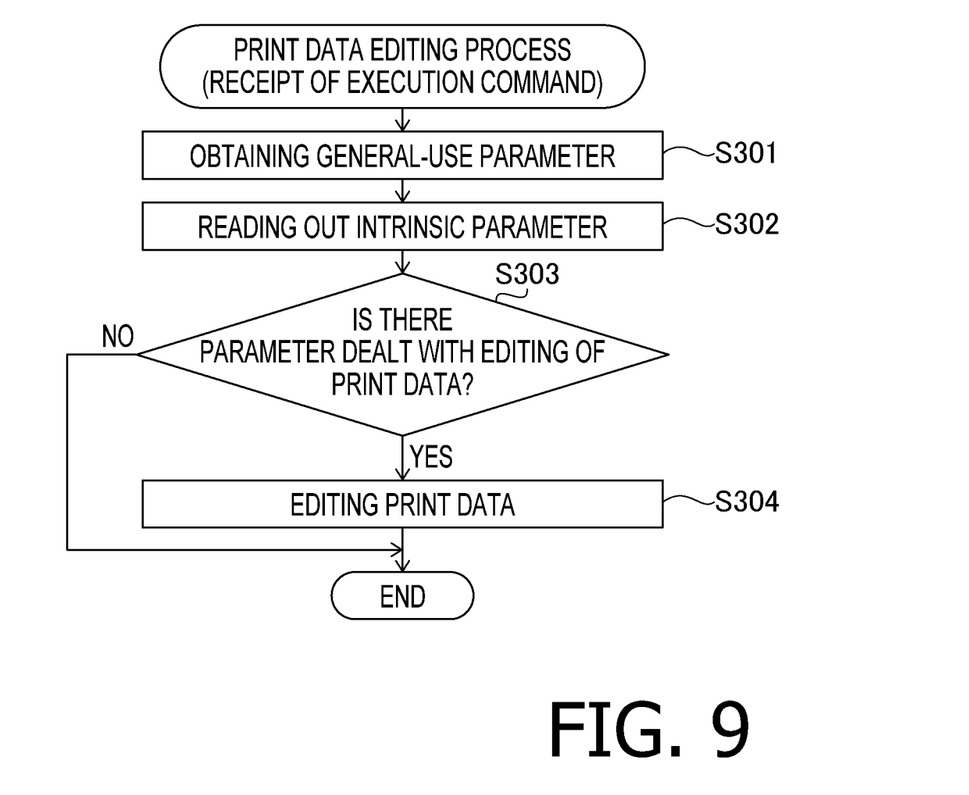
FIG. 9 is a flowchart illustrating a print data editing process.

In the print data editing process, the CPU 11 obtains, among the print parameters, the general-use parameters (S301). Further, the CPU 11 reads out the intrinsic parameters from the storage area for the supporting program 42 (S302). The print parameters obtained in S301 and S302 are print parameters edited in the print parameter editing process. Then, the CPU 11 determines whether the print parameters obtained in S301 and S302 include parameters that can be dealt by editing the print data or not (S303).

If it is determined that the print parameters obtained in S301 and S302 include parameters that can be dealt by editing the print data (S303: YES), the CPU 11 processes the print data (S304). After S304, or if it is determined that the print parameters obtained in S301 and S302 do not include parameters that can be dealt by editing the print data (S303: NO), the CPU 11 notifies the general-use printing program 41 that the print data editing process is terminated and terminates the print data editing process.

That is, only by selecting a print queue through the editing APP 43, the print parameters set in the print queue are automatically set as the print parameters to be used in the printing. For example, by storing the print parameters including the intrinsic parameters in the parameter list 51 in association with a print queue, the intrinsic parameters are automatically used in the printing by selecting the print queue. The user can easily set the intrinsic parameters that cannot be selected in print settings though the editing APP 43 only by selecting a print queue. Therefore, setting operations by the user is easy and thus the printing system is highly convenient.

It is noted that, if the editing APP 43 is an APP that can deal with the intrinsic parameters as well, setting of the print parameters including the intrinsic parameters may be received in the editing APP 43. Further, if the general-use printing program 41 can receive the print parameters including the intrinsic parameters, the print parameters including both the general-use parameters and the intrinsic parameters may be mutually exchanged between the general-use printing program 41 and the supporting program 42.

In this case, the supporting program 42 need not store the intrinsic parameters in the storage area for the supporting program 42 in the memory 12. For example, the CPU 11 may execute S111 and S112 of the print parameter editing process as one step and may set the print parameters including the general-use parameters and the intrinsic parameters as the print parameters of a print job. Further, the CPU 11 may execute S201 and S202 of the intermediate image data editing process as one step and S301 and S302 of the print data editing process as one step, and may obtain the print parameters including the general-use parameters and the intrinsic parameters.

For example, the general-use printing program 41 may generate the print data using the general-use parameters among the received print parameters and may do nothing using the intrinsic parameters. It is noted that, in the editing APP 43 and the general-use printing program 41, for example, the intrinsic parameters and the general-use parameters may be distinguished by a flag provided to each parameter.

As described in detail, with the supporting program 42 according to the present embodiment, a plurality of print queues are generated for one printer, and each print queue is stored in the parameter list 51 while associating with the print parameters. The supporting program 42 is executed when there is a print instruction in a state where a print queue is selected, and the supporting program 42 reads out print parameters corresponding to the selected print queue from the parameter list 51 and sets them as print parameters corresponding to the print instruction. Therefore, only by selecting the print queue when inputting the print instruction, the print parameters corresponding to the print queue are automatically set. Thus, labor for the user to set the print parameters is reduced. Thus, in the PC1 to which the general-use printing program 41 being an OS-standard printing program is implemented, it is possible to reduce labor for the user when performing print settings. Further, since it becomes possible to switch the print parameters with simple operations, it becomes less likely that setting mistakes occur.

Further, since the supporting program 42 according to the present embodiment receives setting of the print parameters corresponding to each of a plurality of print queues and stores the received setting in the parameter list 51 while associating with the corresponding one of a plurality of print queues, the supporting program 42 can read out print parameters corresponding to a selected print queue. Further, since the supporting program 42 according to the present embodiment receives an instruction to set the print parameter through user operations such as clicking of an icon of a print queue or operations of an APP provided by a printer vender and displays the setting screen 61 for the print parameter setting, it is easy to set the print parameters.

Further, since the print parameters are attached to the print instruction as well, if the print parameters attached to the print instruction differ from the print parameters stored in the parameter list 51, user confirmation is performed in the supporting program 42. Therefore, it is possible to reflect the user's intention to the printing. Further, if the print parameters attached to the print instruction is selected, by the CPU 11 receiving an instruction to overwrite the print parameters on the parameter list 51, it becomes possible to use the changed print parameters without confirmation from the next printing.

It is noted that the embodiment disclosed in the present specification is only an illustrative example and is not intended to limit aspects of the present disclosures. Accordingly, the technique disclosed in the present specification can be modified or enhanced without departing from aspects of the disclosures. For example, the device connected to the PC 1 need not be limited to the printer but may be any device which has a printing function (e.g., an MFP, a copier, a facsimile machine and the like). Further, the number of printers connected to the PC 1 need not be limited to that in the illustrated example but may be one or three or more.

In the present embodiment, user confirmation is performed if the print parameters set in the APP differ from the print parameters stored in the parameter list 51. However, the user confirmation need not be performed. For example, the print parameters stored in the parameter list 51 may always be used. In this case, in the print parameter editing process, the CPU 11 only needs to execute S102, S111 and S112.

In the present embodiment, if an instruction to use the print parameters attached to the print instruction is received, user confirmation is further performed to inquire the user whether to change the print parameters stored in the parameter list 51 or not. However, the user confirmation need not be performed. For example, an instruction to change the print parameters stored in the parameter list 51 may be received separately and change of the print parameters stored in the parameter list 51 may not be performed when printing is executed.

Parts of each process described as the process by the general-use printing program 41 in the present embodiment may be a process by the OS 21. Further, the illustrated display formats of the print queue selecting screen are mere examples and thus are not limited to the illustrated examples.

For example, in the embodiment, the supporting program 42 executes three processes, namely, the print parameter editing process, the intermediate image data editing process and the print data editing process. However, the supporting program 42 need not execute all of these processes. For example, the supporting program 42 may be a program that only executes the print parameter editing process. Further, a program for the print parameter editing process, a program for the intermediate image data editing process and a program for the print data editing process may be separate programs.

A module that executes the print parameter editing process is not limited to the supporting program 42 but may be a program that receives instructions form the OS 21 or the general-use printing program 41 when executing printing using the general-use printing program 41. For example, the module may be a print workflow app (i.e., Print workflow) of which specification is disclosed by Microsoft.

In the embodiment, as operations of the supporting program 42, only the editing operation of the print parameters by the print parameter editing process is described in detail. However, the supporting program 42 may have other roles.

In the embodiment, the generation of the intermediate image data by the general-use printing program 41 is performed after the print parameter editing process by the supporting program 42, but they may be performed in the inverse order. In this case, the general-use printing program 41 generates the print data using the print parameters edited in the supporting program 42 and the intermediate image data.

In the embodiment, the supporting program 42 is executed in response to the execution command of the supporting program 42 outputting from the general-use printing program 41. However, the execution timing of the supporting program 42 is not limited to the above. For example, the supporting program 42 may be executed in response to a direct execution instruction from the OS 21 or may be a resident program. If the supporting program 42 is a resident program, the supporting program 42 may execute the aforementioned operations upon receiving execution commands.

In any of the flowcharts disclosed in the embodiment, the order of multiple processes at arbitrary multiple steps may be changed arbitrarily or may be executed in parallel unless there occurs conflicts in processing contents.

The processes disclosed in the present embodiment may be executed by a single CPU, a plurality of CPU's, hardware such as an ASIC or a combination thereof. Further, the processes disclosed in the present embodiment may be realized by various modes such as a non-transitory recording medium storing programs for executing the processes, methods for executing the processes and the like.

What is claimed is:

1. A non-transitory computer-readable recording medium for an information processing apparatus, the information processing apparatus having a controller, an operating system of the information processing apparatus having a general-use printing program, the non-transitory computer-readable recording medium containing computer-executable instructions realizing a supporting program corresponding to a printer connected to the information processing apparatus,
wherein the supporting program is not included in the operating system,
under control of the operating system of the information processing apparatus, the supporting program, as executed by the controller, causing the information processing apparatus to perform:
an obtaining process of, for a single printer which is connected to the information processing apparatus, obtaining a plurality of pieces of identification information each of which identifying corresponding one of a plurality of print queues; and
a storing process of storing setting data in which the plurality of pieces of identification information and a plurality of print parameters are associated with each other for the single printer, respectively, in a memory of the information processing apparatus, each of the plurality of piece of identification information identifying a corresponding one of the plurality of print queues for the single printer, and
wherein the supporting program as executed by the controller further causes the information processing apparatus to perform:
when the controller receives a printing instruction to cause the printer to perform printing using the general-use printing program of the operating system in a state where one of the plurality of print queues for the single printer is selected, a readout process of obtaining identification information of the selected one of the plurality of print queues and reading out corresponding one of the plurality of print parameters associated with the obtained identification information of the selected one of the plurality of print queues; and
an automatic setting process of setting the print parameter read out in the readout process as a print parameter to be used in the printing based on the printing instruction.

2. The non-transitory computer-readable recording medium according to claim 1,
wherein the read-out print parameter includes an intrinsic print parameter which is not dealt in generation of print data by the general-use printing program, and
wherein the supporting program, as executed by the controller, causes the information processing apparatus to perform, when the intrinsic print parameter is set in the automatic setting process, an editing process of editing one of the print data output from the general-use printing program or intermediate image data used for generating the print data, based on the intrinsic print parameter.

3. The non-transitory computer-readable recording medium according to claim 2,
wherein, in the automatic setting process, the set intrinsic print parameter is delivered to the general-use printing program.

4. The non-transitory computer-readable recording medium according to claim 1,
wherein the supporting program, as executed by the controller, causes the information processing apparatus to perform a displaying process of displaying a setting screen for receiving setting of the print parameter when receiving a setting instruction to perform print settings in a state where one of the plurality of print queues for the single printer is selected, and
wherein, in the storing process, when receiving setting of the print parameter through the setting screen, the identification information of the selected print queue is stored in the memory in association with the print parameter of the setting received through the setting screen.

5. The non-transitory computer-readable recording medium according to claim 1,
wherein the supporting program, as executed by the controller, causes the information processing apparatus to perform a selection process of receiving selection of one of the print parameters indicated by the printing instruction and the print parameter read out in the readout process when the print parameter read out in the readout process is not identical to the print parameter indicated by the printing instruction, and
wherein the supporting program, as executed by the controller, causes the information processing apparatus to perform the automatic setting process when the print parameter read out in the readout process is selected in the selection process while not performing the automatic setting process when the print parameter indicated by the printing instruction is selected in the selection process.

6. The non-transitory computer-readable recording medium according to claim 5,
wherein the supporting program, as executed by the controller, causes the information processing apparatus to perform a changing process of changing the print parameter read out in the readout process as a print parameter to be used in the printing based on the printing instruction when the print parameter indicated by the printing instruction is selected in the selection process.

7. The non-transitory computer-readable recording medium according to claim 1,
wherein the general-use printing program outputs an execution command to the supporting program in accordance with the printing instruction after the controller receives the printing instruction and before the general-use printing program starts generation of print data corresponding the printing instruction,
wherein the supporting program, as executed by the controller, causes the information processing apparatus to perform the readout process when the execution command is output.

8. An information processing apparatus having a controller,
wherein a supporting program corresponding to a printer connected to the information processing apparatus is implemented in the information processing apparatus,
wherein an operating system of the information processing apparatus has a general-use printing program which is implemented in the operating system,
wherein the supporting program is not included in the operating system,
wherein, by using the supporting program under control of the operating system, the controller is configured to perform:
an obtaining process of, for a single printer which is connected to the information processing apparatus, obtaining a plurality of pieces of identification information each of which identifying corresponding one of a plurality of print queues; and
a storing process of storing setting data in which the plurality of pieces of identification information and a plurality of print parameters are associated with each other for the single printer, respectively, in a memory of the information processing apparatus, each of the plurality of piece of identification information identifying a corresponding one of the plurality of print queues for the single printer, and
wherein, by using the supporting program under control of the operating system, the controller is further configured to perform:
when the controller receives a printing instruction to cause the printer to perform printing using the general-use printing program of the operating system in a state where one of the plurality of print queues for the single printer is selected, a readout process of obtaining identification information of the selected one of the plurality of print queues and reading out corresponding one of the plurality of print parameters associated with the obtained identification information of the selected one of the plurality of print queues; and
an automatic setting process of setting the print parameter read out in the readout process as a print parameter to be used in the printing based on the printing instruction.

9. A method of controlling an information processing apparatus having a controller, a printer being connected to the information processing apparatus, a supporting program corresponding to the printer being implemented in the information processing apparatus, an operating system of the information processing apparatus having a general-use printing program which is implemented in the operating system,
wherein the supporting program is not included in the operating system,
wherein, by using the supporting program under control of the operating system, the method includes:
for a single printer which is connected to the information processing apparatus, obtaining a plurality of pieces of identification information each of which identifying corresponding one of a plurality of print queues; and
storing setting data in which the plurality of pieces of identification information and a plurality of print parameters are associated with each other for the single printer, respectively, in a memory of the information processing apparatus, each of the plurality of piece of identification information identifying a corresponding one of the plurality of print queues for the single printer, and
wherein the method further includes:
when the controller receives a printing instruction to cause the printer to perform printing using the general-use printing program of the operating system in a state where one of the plurality of print queues for the single printer is selected, obtaining identification information of the selected one of the plurality of print queues and reading out corresponding one of the plurality of print parameters associated with the obtained identification information of the selected one of the plurality of print queues; and
setting the print parameter read out as a print parameter to be used in the printing based on the printing instruction.

\* \* \* \* \*